United States Patent
Westphal

(10) Patent No.: US 8,135,021 B2
(45) Date of Patent: Mar. 13, 2012

(54) ROUTING IN WIRELESS AD-HOC NETWORKS

(75) Inventor: Cedric Westphal, San Francisco, CA (US)

(73) Assignee: Nokia Corporation, Espoo (FI)

(*) Notice: Subject to any disclaimer, the term of this patent is extended or adjusted under 35 U.S.C. 154(b) by 919 days.

(21) Appl. No.: 11/529,801

(22) Filed: Sep. 28, 2006

(65) Prior Publication Data

US 2008/0080520 A1  Apr. 3, 2008

(51) Int. Cl.
*H04L 12/28* (2006.01)
*H04L 12/56* (2006.01)

(52) U.S. Cl. .................. 370/400; 370/422

(58) Field of Classification Search .............. None
See application file for complete search history.

(56) References Cited

U.S. PATENT DOCUMENTS

| | | | | |
|---|---|---|---|---|
| 5,412,654 A | * | 5/1995 | Perkins | 370/312 |
| 2004/0066313 A1 | * | 4/2004 | Ong et al. | 340/870.11 |
| 2004/0190476 A1 | | 9/2004 | Bansal et al. | |
| 2006/0013154 A1 | * | 1/2006 | Choi et al. | 370/312 |
| 2007/0266395 A1 | * | 11/2007 | Lee et al. | 725/11 |

FOREIGN PATENT DOCUMENTS

EP  1580941 A1  9/2005

OTHER PUBLICATIONS

Akkaya et al., A survey on routing protocols for wireless sensor networks. Ad Hoc Newtorks, Elsevier, 3(3): 325-349, May 2005. XP004848801.
International Search Report for PCT Application No. PCT/IB2007/001944.

* cited by examiner

*Primary Examiner* — Chirag Shah
*Assistant Examiner* — Srinivasa Reddivalam
(74) *Attorney, Agent, or Firm* — Harrington & Smith

(57) ABSTRACT

A method of transmitting data in a communication system from a first node to destination node comprising transmitting the data from the first node to an intermediate node; determining if the intermediate node communicated with the destination node more recently than the first node that transmitted the data to the intermediate node communicated with the destination node; forwarding the data from the intermediate node to a further node if the intermediate node communicated with the destination node more recently than the first node that transmitted the data to the intermediate node communicated with the destination node.

47 Claims, 1 Drawing Sheet

ROUTING IN WIRELESS AD-HOC NETWORKS

FIELD OF THE INVENTION

The present invention relates to wireless ad-hoc networks and, more particularly, to efficient routing techniques for use in wireless ad-hoc networks.

BACKGROUND OF THE INVENTION

A wireless ad-hoc network, also sometimes referred to as a mobile ad-hoc network (MANET), is known to comprise a set of nodes connected by wireless links. A typical example of an ad-hoc network is a wireless sensor network, where the nodes are sensors that gather environmental data and send the information to computational nodes, otherwise known as sink nodes, for further processing, or to base stations for relay to a wired network. Such networks may be deployed, for example, in hazardous locations such as in disaster areas (e.g., earthquakes, fires, etc.) to aid rescue efforts, in areas for mineral or oil prospecting, and in battlefields for defence applications.

In some applications the sink node has a fixed position. In other applications however, such as perimeter monitoring for physical intrusion detection, or for home automation, the sink should be mobile. For example in the case of perimeter monitoring the sink node may be carried by a security guard moving around the perimeter. In the case of home automation the sink node may be carried in a universal remote control by the user living in the home.

The topology of an ad-hoc network is typically dynamic since nodes are free to move randomly and organize themselves arbitrarily. The nodes in an ad-hoc network typically attempt to communicate information to the sink node by relaying packets. How to route a packet to the sink poses a problem. A broadcast packet would find the sink but at the expense of flooding the network. Conversely a probabilistic forwarding to an estimation of the sink's random position would only find the sink within some probability bounds. It is therefore necessary to design efficient routing protocols to meet a variety of performance objectives given such a communication environment.

Since in a wireless sensor network, sensor nodes operate with an isolated power supply, such as a battery, one such performance objective is energy efficiency. This is crucial to the operation of the network since the lifetime of a sensor node in the network is dependent on the lifetime of the battery.

Most existing routing protocols for ad hoc networks do not take into account the constraints of a wireless sensor network, in particular the characteristic that there is only one or very few sink nodes in the network to which communication is directed.

Routing protocols such as AODV (Ad Hoc On Demand Distance Vector) and DSR (Dynamic Source Routing) take mobility of the network nodes into account but are not energy efficient. Protocols which are designed to be energy efficient, such as gradient based routing, are not designed to support the mobility of the sink node.

US 2005/0135360 describes a method of providing a routing protocol in a sensor network. Energy information is contained in a request message of an AODV protocol, thereby allowing the neighbouring nodes and the nodes on the path to know their energy states.

US 2005/0157698 describes a method of updating routing information in a wireless sensor network. A sensor node collects information of a target and broadcasts a routing request message when the information of the target is not received anymore. Route information may be updated based on the information contained in the routing request massage from the sensor node.

The LER (Last Encounter Routing) protocol is used in ad hoc networks and uses information based on the time and location of a node with a destination node. Geographic routing is used to route a packet to the location of the last encounter with the destination node.

It is therefore an aim of the present invention is to maximize the energy efficiency in a sensor network.

SUMMARY OF THE OF INVENTION

According to a first aspect of the present invention there is provided a method of transmitting data in a communication system from a first node to destination node comprising; transmitting the data from the first node to an intermediate node, determining if the intermediate node communicated with the destination node more recently than the first node that transmitted the data to the intermediate node communicated with the destination node and forwarding the data from the intermediate node to a further node if the intermediate node communicated with the destination node more recently than the first node that transmitted the data to the intermediate node communicated with the destination node.

According to a second aspect of the present invention there is provided a method of transmitting the data in a communication system from a first node to a destination node comprising; receiving at the first node time information relating to when an intermediate node communicated with the destination node, determining at the first node if the intermediate node communicated with the destination node more recently than the first node communicated with the destination node and transmitting the data to the intermediate node if the intermediate node communicated with the destination node more recently than the first node communicated with the destination node.

According to a third aspect of the present invention there is provided a communication system comprising a first node, an intermediate node, a further node and a destination node wherein the first node comprises; transmitting means for transmitting data to the intermediate node, and wherein the intermediate node comprises; determining means for determining if the intermediate node communicated with the destination node more recently than the first node that transmitted the data to the intermediate node communicated with the destination node; and transmitting means for forwarding the data from the intermediate node to a further node if the intermediate node communicated with the destination node more recently than the first node that transmitted the data to the intermediate node communicated with the destination node.

According to a fourth aspect of the present invention there is a communication system comprising a first node, an intermediate node and a destination node wherein the first node comprises; receiving means for receiving time information relating to when the intermediate node communicated with the destination node; determining means for determining if the intermediate node communicated with the destination node more recently than the first node communicated with the destination node; and transmitting means for transmitting the data to the intermediate node if the intermediate node communicated with the destination node more recently than the first node communicated with the destination node.

According to a fifth aspect of the present invention there is provided a node comprising a detector for detecting if it is in communication with a destination node, a timer for timing the time lapsed since communicating with the destination node, a processor for determining if an intermediate node communicated with a destination node more recently than the node communicated with the destination node and a transmitter for forwarding data to the intermediate node if the intermediate node communicated with the destination node more recently than the node communicated with the destination node.

According to a sixth aspect of the present invention there is provided a computer program comprising program code means adapted to perform, when the program is run on a computer or on a processor, the of steps of transmitting the data from a first node to an intermediate node, determining if the intermediate node communicated with a destination node more recently than the first node that transmitted the data to the intermediate node communicated with the destination node and forwarding the data from the intermediate node to a further node if the intermediate node communicated with the destination node more recently than the first node that transmitted the data to the intermediate node communicated with the destination node.

According to a seventh aspect of the presenting invention there is provided a computer program comprising program code means adapted to perform, when the program is run on a computer or on a processor, the of steps of receiving at a first node time information relating to when an intermediate node communicated with a destination node, determining at the first node if the intermediate node communicated with the destination node more recently than the first node communicated with the destination node and transmitting the data to the intermediate node if the intermediate node communicated with the destination node more recently than the first node communicated with the destination node.

BRIEF DESCRIPTION OF DRAWINGS

For a better understanding of the present invention and as to how the same may be carried into effect, embodiments of the present invention will now be described with reference to the following drawings.

DETAILED DESCRIPTION OF THE INVENTION

The topology of an ad-hoc network is typically dynamic since nodes are free to organize themselves arbitrarily. Therefore, the topology may be determined by the geographic location of the nodes.

Figure 1:
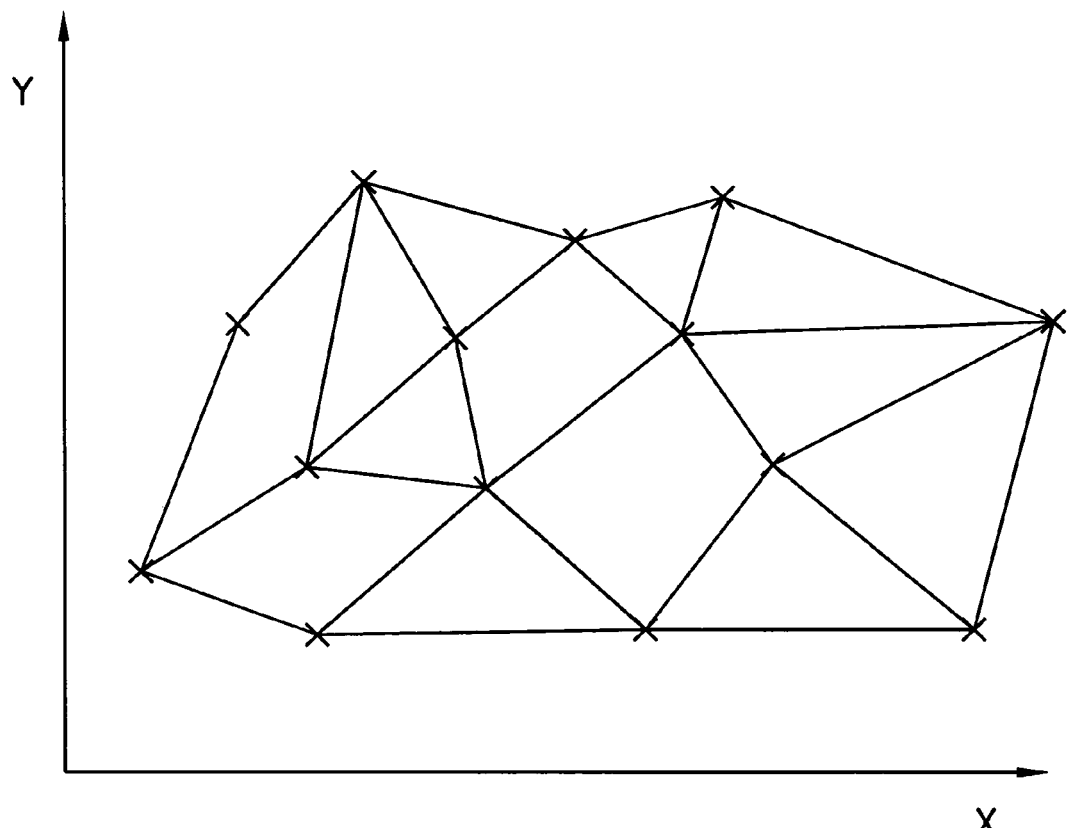
FIG. 1 shows a graph representing the topology of a sensor network.

FIG. 1 shows a graph representing the topology of a sensor network. Each vertex of the graph represents a sensor node in the network, and "edges" of the graph representing links between nodes. The mobile sink roams within the network and establishes a connection to the sensor node closest to the sink. The sink node is assumed to be always situated at one of the nodes and to only move along the edges of the graph. According to this assumption the mobile sink cannot successively attach to two sensor nodes unless there is an edge connecting the vertices, however this assumption is not restrictive since most sensor networks are dense enough to ensure that there is no 'hole' in the area for the sink to cross and that the sink remains connected to the network.

In an embodiment of the invention the sensor nodes are stationary or at least stationary over a period of time.

The movement of the sink shown in FIG. 1 can be modelled as a random walk on the graph. Assuming a slotted time t, where S(t)=v is the position of the sink at time t∈Z $$P(S(t+1) = u \mid S(t) = v) = \begin{cases} q(u, v) \ldots \text{if} \ldots u \leftrightarrow v \\ 0 \ldots \text{otherwise} \end{cases} \quad (1)$$

Where u is the position of the sink at the next time slot t+1, and q(i,j) is the transition matrix defining the movement of the random walk. q(i,j) can be computed by observing the movement of the sink over a time period, or can be given a priori.

According to an embodiment of the invention, each sensor node stores an indication of how recently it has been attached to, that is, in direct communication with the sink node.

In one embodiment of the invention the sensor node includes means for determining if it is attached to the sink node. The sensor node may then record the time of a communication event relating to when it was attached to the sink.

In one embodiment of the invention the sensor node may be arranged to store an indication of the time lapsed since the sink node was attached to the sensor node, each time the sink node starts direct communication with the sensor node.

According to this embodiment of the invention the sensor node may start a timer when direct communication between the sink node and the sensor node starts.

Alternatively the sensor node may store a time stamp recording the time at which the sink node started direct communication with the sensor node. The age of the last visit may then be determined by subtracting the time of the last visit indicated by the time stamp from the current time.

In an alternative embodiment of the invention the sensor node may be arranged to store an indication of the time lapsed since the sink node was attached to the sensor node each time the sink node leaves the location of a sensor node According to this embodiment of the invention the sensor node may start a timer when direct communication between the sink node and the sensor node stops and the sink node leaves the location of the sensor node.

Alternatively the sensor node may store a time stamp recording the time at which the sink node stopped direct communication with the sensor node. The age of the last visit may then be determined by subtracting the time of the last visit indicated by the time stamp from the current time.

Accordingly, each sensor includes a timer which stores an indication of the time T lapsed since the sensor node was connected with the mobile sink. As stated above, the timer may be started when the sink attaches to the sensor node or when the sink node leaves the sensor node. Alternatively the timer of a sensor node may be started at any other point during the communication, providing that the sensor nodes are arranged to each record an indication of the time at the same point during the connection with the sink node.

The time T lapsed since the sensor node was connected to the sink may be referred to as the age of the last visit.

The sensor network is deployed to monitor the variations of some parameter, for instance, temperature in a building, or movement through some location. An alert may be issued from a sensor node and propagated to the mobile sink whenever the sensed parameters at the sensor node leave a predefined normal operating range.

Figure 2:
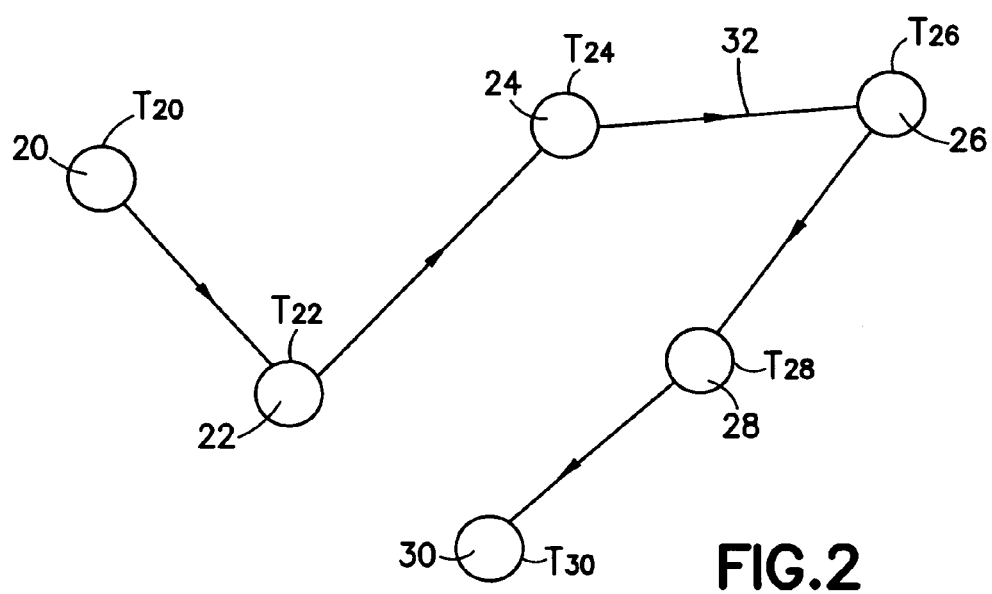
FIG. 2 shows a plurality of neighbouring sensor nodes.

FIG. 2 shows a plurality of neighbouring sensor nodes 20, 22, 24, 26, 28 and 30 and the path 32 taken by the mobile sink node (not shown). FIG. 2 also shows the age of the last visit $T_x$ for each sensor node where x indicates the sensor node to which T relates, where $T_{20} > T_{22} > T_{24} > T_{26} > T_{28} > T_{30}$.

When a sensor issues an alert, it transmits the alert to the sink node via one or more neighbouring nodes. The methods by which the alert can transmitted will now be discussed in relation to FIG. 2.

In one embodiment of the invention the sensor node 24 transmits the alert by broadcasting the alert to the surrounding nodes 20, 22, 26, 28, and 30. The alert is broadcast together with an indication of the time $T_{24}$ lapsed since the sensor node 24 was visited by the mobile sink. On receiving the broadcast alert each node compares the time $T_{24}$ broadcast with the alert to the time indicated on its own timer. If the time indicated on the receiving sensor nodes timer is less that $T_{24}$ indicated with the broadcast alert the receiving sensor node is arranged to broadcast the alert again, but with its own indication of the age of the last visit of the sink node. The sensor nodes in the network will continue to broadcast the alert in this manner until the broadcast alert reaches the sensor node that is in communication with the sink node.

Conversely if the timer of the receiving sensor node indicates that the age of the last visit is greater than that included with the broadcasted node the receiving sensor node does not forward the alert.

As can be seen in FIG. 2, if the sensor node 24 broadcasts the alert to sensor nodes 20, 22, 26, 28 and 30, only nodes 26, 28 and 30 will each broadcast the alert again since these nodes were visited by the sink node more recently than the sensor node 24.

Sensor nodes that were visited more recently by the sink than a sensor node broadcasting the alert will continue to broadcast the alert such that eventually the alert will be broadcast in the vicinity of the sink and be received by the sink.

In another embodiment of the invention the sensor nodes may share the time lapsed since the last visit $T_x$ independently of transmitting an alert to the sink node.

In one embodiment of the invention a sensor node which updates an indication of the age of the last visit following a new visit from the sink node, might share it with neighbouring sensor nodes by broadcasting a message with the updated indication of the age of the last visit. The broadcast message may comprise a time stamp relating to was in communication with the sensor node. The neighbouring nodes may then store the time stamp together with the identification of the sensor node in order to determine the age of the last visit of the sink node to a particular sensor node.

In an alternative embodiment of the present invention the sensor nodes are arranged to periodically broadcast to the neighbouring nodes an indication of the age of the last visit by the sink node.

According to another embodiment of the invention each neighbouring sensor node is arranged to update its neighbour with an indication of the time lapsed since it was last visited by the sink node, by performing a handshake at predetermined times. A handshake is a communication of information between two nodes, which may be initiated by either node.

In an alternative embodiment of the present invention neighbouring sensor nodes are arranged to update each other with an indication of the time lapsed since each sensor node was last visited by the sink node, by performing a handshake only after the sink node has left the node.

In an alternative embodiment of the present invention neighbouring sensor nodes are arranged to update each other with an indication of the time lapsed since each sensor node was last visited by the sink node, by performing a handshake when the sink node attaches to the node.

In an alternative embodiment of the invention a sensor node may use an indication of the age of the last visit of the sink to a neighbouring sensor node to determine a virtual last visit age for itself.

For example, a node which receives an indication of the last visit age of a neighbouring node which is less than its own last visit age, may update its own last visit age with a virtual value. The virtual age may be calculated such that the virtual age indicates that the node was visited by the sink node before the sink node visited the neighbouring node. The virtual age may be based on the received last visit age of its neighbour and an estimation of the time it would take the sink to travel between the two nodes. This estimation may be a predetermined amount. In a preferred embodiment of the invention when used in a network which uses a time slotted protocol, the estimation of the time to travel is set as half a time slot in order to avoid creating routing loops.

In an embodiment of the invention, the sensor nodes are at the same geographical location over a period of time. According to this embodiment it may only be necessary to update the information in neighbouring nodes after a sensor node is visited by a sink node. This greatly reduces the amount of signalling required within the network.

When transmitting an alert, a sensor node may use the information it has on how recently the sink node visited each of the neighbouring nodes in order to transmit the alert to the sink node via specific sensor nodes and therefore avoid broadcasting the alert.

According to an embodiment of the invention, a sensor node is arranged to determine which neighbouring node was visited most recently by the mobile sink node and to only forward the alert to that node. In the arrangement shown in FIG. 2, sensor node 24 would therefore only transmit the alert to sensor node 30. In this embodiment of the invention it is necessary for the node 24 to have knowledge of how recently the sink node visited each of the neighbouring nodes.

In an embodiment of the invention an indication of the last visit age of each sensor neighbouring node is stored in a memory provided at each sensor node.

Eventually, the packet will reach the node which is directly connected to the sink and this node will relay the packet to the sink, completing the delivery of the alert.

In a preferred embodiment of the invention, when the alert is only transmitted to sensor nodes that were visited by the sink more recently than the transmitting node, the sensor nodes may be arranged to time the age of the last visit from when the sink attaches to them. In this embodiment the alert may be transmitted to the sensor node currently attached to the sink node as it will be recognised as having a younger last visit age than the other sensor nodes. The sensor node attached to the sink may then pass the alert directly to the sink.

Alternatively the sink node may be arranged to constantly indicate a 'zero time' for the age of the last visit thereby allowing an alert to be transmitted directly to the sink from an unattached transmitting node.

In an embodiment of the invention there may be more than one mobile sink node.

According to one embodiment of the invention it may be necessary to route an alert to a specific one of the plurality of sink nodes. This may be the case for when each sink node has a separate functionality, for example one sink node may be used to send intrusion alerts to, while another sink may be used to send equipment failure alerts to. In this case it is necessary for the each source node to store a parameter indicating age of the last visit for each sink node. According to this embodiment of the invention it may also necessary for the alert to indicate which sink node the alert should be routed to. Otherwise the sensor nodes may be arranged to recognise which type of alert should be routed to which sink node.

According to another embodiment of the invention the sink nodes may have the same functionality and the alert may be routed to any of the sink nodes. In this embodiment it is only necessary for the sensor nodes to store a parameter indicating the time lapsed since the last sink node visited.

In one embodiment of the invention, a path may be created from a sensor node that has not previously encountered the sink by broadcasting a request from the sensor node in order to find a sensor node which has been visited by the sink. The request may follow an increase diameter search in order to find another sensor node that has been visited by the sink node. The sensor node that is found by the request to have been visited by the sink node then sends a response to the sensor node that transmitted the request, with an indication of the age of the last visit from the sensor node. The response is sent back to the sensor node that transmitted the request along the path on which the request was transmitted.

The sensor node that transmitted the request may then update its last visit age with a virtual value that is older than the last visit age of the closest sensor node last visited by the sink. If there are other sensor nodes on the return path each of the sensor nodes may also update their last visit age with a virtual value.

Results:

Analysis results of the proposed protocol according to the present invention will now be compared to results for flooding the network with a broadcast message and to results for an optimal system:

A. Linear Topology

Cycle: We consider a 1-dimensional graph with N nodes, such that nodes i and i are connected, as well as node N and 1, thus closing the cycle. We consider the mobile sink moving to either neighbour with equal probability at each step. We have the following two results:

Theorem IV.1: If the distribution of alerts is uniform, the cost $c_{tt}$ of alerting the mobile sink using the proposed protocol is on average half that of the cost $c_f$ for the full flooding, and is equal to $2c^*$.

$$c_{tt} = \frac{c_f}{2} = 2c^*$$

Theorem IV.2: The notification delay $d_{tt}$ for the proposed protocol is equal to twice the delay for the full flooding and to twice the optimal delay $d^*$.

$$d_{tt} = 2d_f = 2d^*$$

Proof: Denote by i the position of the alert, and j the position of the sink. Since the network is closed into a cycle, all vertices are equivalent, and we can take i=1 with no loss of generality. Sending a message from the alert to the sink can take exactly two paths here, either clockwise, or counterclockwise. Flooding will send exactly N messages around both directions of the cycle, while the proposed protocol will send packets in only one direction, that of the lesser ages. Since j is uniformly distributed over $\{1, \ldots, N\}$, the cost on average will be N/2.

The optimal cost is the shortest distance between 1 and j, ie. The smallest of j−1 and N+1−j. On average, the cost is thus equal to N/4.

For the delay, some packets in the flooding mechanism will take the optimal path, thus $d_f = d^*$. The proposed algorithm might take a longer path. The cost computation translates into a delay of twice the optimal delay.

While the proposed protocol is far from optimal in this scenario, it is a significant cost improvement over flooding.

Line segment: We consider now the same graph, but as a straight line, without the connection N↔1. Again, we assume that the mobile sink moves left or right with equal probability, except at node 1 where it can only go right, and node N where it can only go left. It is easy to compute the steady state distribution of this random walk. Denote by $\pi_k$, $1 \leq k \leq N$ the probability that the mobile sink is at vertex k, then:

$$\pi_k = \frac{1}{N-1} \text{ for } 2 \leq k \leq N-1$$

$$\pi_1 = \pi_N = \frac{1}{2(N-1)}$$

Theorem IV.3: If the distribution of alerts is uniform, the cost $c_{tt}$ of alerting the mobile sink using the proposed protocol is on average half that of the cost $c_f$ for the full flooding, and is equal to $c^*$.

$$c_{tt} = \frac{c_f}{2} = c^*$$

Theorem IV.4: The notification delay $d_{tt}$ for the proposed protocol is equal to the delay for the full flooding and to the optimal delay $c^*$.

$$c_{tt} = \frac{c_f}{2} = c^*$$

Proof: The delay result is trivial: flooding floods from the alert in two directions, while the optimal solution and the proposed protocol only flood in the right direction. In any case, all three reach the sink at the same time.

The main difference here is in cost. It is trivial that $c_{tt} = c^*$: the node which receives the alert knows on which side is the mobile sink using the freshest age of its two neighbours. We only need to compare $c_f$ and $c_{tt}$.

Define i to be the position of the alert, j the position of the sink. The cost $c_{tt}$ is equal to |i−j|, while the cost $c_f$ is given by:

$$c_f = j \text{ if } j > i$$

$$c_f = N - j \text{ if } i < j$$

$$c_f = 0 \text{ if } i = j$$

Using the distribution in (4) and the fact that the alert is uniformly distributed, one can compute the average cost. Since, for a fixed j, $P(l>j)=(N−j−1)/N$, and $P(i<j)=(j−1)/N$, the cost $c_f$ is:

$$c_f = \sum_{j=1}^{N} \pi_j \frac{j(j-1) + (N-j)(N-j-1)}{N} \quad (8)$$

$$= \sum_{j=1}^{N} \pi_j \frac{2j^2 - (2N+1)j + N(N-1)}{N}$$

For large N, we can approximate π with a uniform distribution, and we obtain the cost:

$$c_f = \frac{1}{N^2}\left(2\sum j^2 - (2N+1)\sum j + N^2(N-1)\right) \quad (9)$$
$$= N - 1 - \frac{(N+1)(2N+1)}{6N}$$
$$\sim \frac{2N}{3}$$

using, to get the 2nd line, the well known formulas for the sum of the integers and the sum of the squares.

We lastly need to compute the actual cost $c_{tt}$:

$$c_{tt} = \sum_{j=1}^{N} \pi_j \left( \sum_{i=1}^{j-1} \frac{j-i}{N} + \sum_{i=j+1}^{N} \frac{i-j}{N} \right) \quad (10)$$
$$\sim \frac{N}{3}$$

where we again approximated the distribution of j as uniform and took the asymptotic behaviour to be optimal in 2 dimensions, but we expect a significant improvement over flooding the network.

Embodiments of this invention are not limited to sensor networks and may be applied to other networks such as any static network having some mobile nodes, such as a metropolitan wireless mesh network which provides wireless broadband to a city-wide area by using a collection of access points (or hot spots) in such density that the whole area is covered.

The required data processing functions in the above described embodiments of the present invention may be implemented by either hardware or software. All required processing may be provided in a controller provided at each node. Appropriately adapted computer program code product may be used for implementing the embodiments, when loaded to a computer, for example for computations required when determining the path of an alert. The program code product for providing the operation may be stored on and provided by means of a carrier medium such as a carrier disc, card or tape. Implementation may be provided with appropriate software in a control node.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of transmitting data in a communication system from a first node to destination node comprising:
   transmitting the data from the first node to an intermediate node;
   determining if the intermediate node communicated with the destination node more recently than the first node that transmitted the data to the intermediate node communicated with the destination node;
   forwarding the data from the intermediate node to a further node if the intermediate node communicated with the destination node more recently than the first node that transmitted the data to the intermediate node communicated with the destination node,
   wherein time information relating to when at least one of the first node and the intermediate node communicated with the destination node is transmitted with the data, and
   wherein the first node transmits a request to find the intermediate node that has been in communication with the destination node when the first node has not previously directly communicated with the destination node.

2. A method of transmitting the data in a communication system from a first node to a destination node comprising;
   receiving at the first node time information relating to when an intermediate node communicated with the destination node:
   determining at the first node if the intermediate node communicated with the destination node more recently than the first node communicated with the destination node;
   transmitting the data to the intermediate node if the intermediate node communicated with the destination node more recently than the first node communicated with the destination node,
   wherein time information relating to when at least one of the first node and the intermediate node communicated with the destination node is transmitted with the data, and
   wherein the first node transmits a request to find the intermediate node that has been in communication with the destination node when the first node has not previously directly communicated with the destination node.

3. A method as claimed in claim 1 wherein at least one of the first node and the intermediate node transmits the data by broadcasting the data.

4. A method as claimed in claim 2 wherein the first node receives time information via a handshake with the intermediate node.

5. A method as claimed in claim 2 wherein the time information is transmitted separately from the data.

6. A method as claimed in claim 2 wherein the time information is the time lapsed since either the first node or the intermediate node communicated with the destination node.

7. A method as claimed in claim 6 wherein the time lapsed is determined by timing the time lapsed from when the destination node stops communicating directly with either the first node or the intermediate node.

8. A method as claimed in claim 6 wherein the time lapsed is determined by timing the time lapsed from when the destination node starts communicating directly with either the first node or the intermediate node.

9. A method as claimed in claim 6 wherein the time lapsed is determined by subtracting the time when the destination node stopped communication directly with either the first node or the intermediate node from the current time.

10. A method as claimed in claim 6 wherein the time lapsed is determined by subtracting the time when the destination node started communication directly with either the first node or the intermediate node from the current time.

11. A method as claimed in claim 6 wherein the time lapsed is an estimated value calculated by adding a predetermined amount to the time lapsed from when the destination node stopped communicating directly with a neighbour node.

12. A method as claimed in claim 6 wherein the time lapsed is an estimated value calculated by adding a predetermined amount to the time lapsed from when the destination node started communicating directly with a neighbour node.

13. A method as claimed in claim 1 wherein the data comprises an alert.

14. A method as claimed in claim 13 wherein the alert is generated by the first node when parameters sensed by the first node exceed a predefined threshold.

15. A method as claimed in claim 1 wherein the at least one of the first node, intermediate node and further node is static.

16. A method as claimed in claim 1 further comprising the step of storing time information for at least one of the first node, intermediate node and further node when at least one of the first node, intermediate node and further node was in contact with the destination node.

17. A method as claimed in claim 1 wherein there is more than one destination node.

18. A method as claimed in claim 16 wherein there at least one of the first node, intermediate node and further node stores time information relating to more than one destination node.

19. A method as claimed in claim 1 wherein the first node is the source node.

20. A method as claimed in claim 1 wherein the destination node is a sink node.

21. A method as claimed in claim 1 wherein at least one of the first node, the intermediate node and the further node are sensor nodes.

22. A method as claimed in claim 1 wherein the further node is the destination node.

23. A method as claimed in claim 1 wherein the communication system is an ad hoc network.

24. A method as claimed in claim 1 wherein the communication system is a sensor network.

25. A method as claimed in claim 1 wherein the communication system is metropolitan wireless mesh network.

26. A method as claimed in claim 1 where in the intermediate node is arranged to transmit a response to the request to the first node, containing an indication of the time when it communicated with the destination node.

27. A method as claimed in claim 26 wherein the first node is arranged to update the time information relating to when it was last in communication with the destination node based on the response.

28. A communication system comprising a first node, an intermediate node, a further node and a destination node wherein the first node comprises:
a transmitter configured to transmit data to the intermediate node;
and wherein the intermediate node comprises;
a processor configured to determine if the intermediate node communicated with the destination node more recently than the first node that transmitted the data to the intermediate node communicated with the destination node; and
a transmitter configured to forward the data from the intermediate node to a further node if the intermediate node communicated with the destination node more recently than the first node that transmitted the data to the intermediate node communicated with the destination node,
wherein time information relating to when at least one of the first node and the intermediate node communicated with the destination node is transmitted with the data, and
wherein the first node transmits a request to find the intermediate node that has been in communication with the destination node when the first node has not previously directly communicated with the destination node.

29. A communication system comprising a first node, an intermediate node and a destination node wherein the first node comprises:
a receiver for receiving time information relating to when the intermediate node communicated with the destination node;
a processor for determining if the intermediate node communicated with the destination node more recently than the first node communicated with the destination node; and
a transmitter for transmitting the data to the intermediate node if the intermediate node communicated with the destination node more recently than the first node communicated with the destination node,
wherein at least one of the time information relating to when the intermediate node communicated with the destination node and time information relating to when the first node communicated with the destination mode is transmitted with the data, and
wherein the first node transmits a request to find the intermediate node that has been in communication with the destination node when the first node has not previously directly communicated with the destination node.

30. A communication system as claimed in claim 28 wherein at least one of the first node, intermediate node and further node further comprise a timer for recording time information relating to when it communicated with the destination node.

31. A communication system as claimed in claim 30 wherein the timer records the time lapsed since the destination node stopped communicating with the first node, intermediate node or further node.

32. A communication system as claimed in claim 30 wherein the timer records the time lapsed since the destination node started communicating with the first node, intermediate node or further node.

33. A communication system as claimed in claim 30 wherein the timer records a time stamp of when the destination node stopped communicating with the first node, intermediate node or further node.

34. A communication system as claimed in claim 30 wherein the timer records a time stamp of when the destination node started communicating with the first node, intermediate node or further node.

35. A communication system as claimed in claim 28 wherein the data comprises an alert.

36. A communication system as claimed in claim 28 wherein the communication system is an ad hoc network.

37. A communication system as claimed in claim 28 wherein the communication system is a sensor network.

38. A communication system as claimed in claim 28 wherein the communication system is a wireless mesh network.

39. A communication system as claimed in claim 28 wherein at least one of the first node, the intermediate node and the further node comprise means for determining if it is in communication with the destination node.

40. A destination node for use in a communication system as claimed in claim 28.

41. A destination node as claimed in claim 40 further comprising means for indicating time information.

42. A destination node as claimed in claim 41 wherein the value of the time information indicated by the destination node relating to when the intermediate node communicated with the destination node is less than the value of the time information relating to when any other node communicated with the destination node.

43. A destination node for use in a communication system comprising:

a transmitter configured to establish connection with an intermediate node; and a receiver configured to receive data from the intermediate node, wherein the receiver is arranged to receive data broadcast from a further node, wherein time information relating to when at least one of a first node and the intermediate node communicated with the destination node is transmitted with the data to the intermediate node, and wherein the first node transmits a request to find the intermediate node that has been in communication with the destination node when the first node has not previously directly communicated with the destination node.

44. A destination node as claimed in claim 43 wherein the transmitter is arranged to transmit time information indicating that the time lapsed since the destination node communicated with the intermediate node is zero.

45. A first node comprising:

a detector configured to detect if it is in communication with a destination node;

a timer configured to time the time lapsed since communicating with the destination node;

a processor configured to determine if an intermediate node communicated with a destination node more recently than the first node communicated with the destination node; and a transmitter configured to forward data to the intermediate node if the intermediate node communicated with the destination node more recently than the first node communicated with the destination node, wherein time information relating to at least one of the lapsed time and when the intermediate node communicated with the destination node is transmitted with the data, and wherein the first node transmits a request to find the intermediate node that has been in communication with the destination node when the first node has not previously directly communicated with the destination node.

46. A computer program product, embodied on a non-transitory computer-readable medium, comprising program code configured to perform, when the program code is run on a computer or on a processor:

transmitting the data from a first node to an intermediate node;

determining if the intermediate node communicated with a destination node more recently than the first node that transmitted the data to the intermediate node communicated with the destination node; and forwarding the data from the intermediate node to a further node if the intermediate node communicated with the destination node more recently than the first node that transmitted the data to the intermediate node communicated with the destination node, wherein time information relating to when at least one of the first node and the intermediate node communicated with the destination node is transmitted with the data, and wherein the first node transmits a request to find the intermediate node that has been in communication with the destination node when the first node has not previously directly communicated with the destination node.

47. A computer program product, embodied on a non-transitory computer-readable medium, comprising program code configured to perform, when the program code is run on a computer or on a processor:

receiving at a first node time information relating to when an intermediate node communicated with a destination node;

determining at the first node if the intermediate node communicated with the destination node more recently than the first node communicated with the destination node; and transmitting the data to the intermediate node if the intermediate node communicated with the destination node more recently than the first node communicated with the destination node, wherein time information relating to when at least one of the first node and the intermediate node communicated with the destination node is transmitted with the data, and wherein the first node transmits a request to find the intermediate node that has been in communication with the destination node when the first node has not previously directly communicated with the destination node.

* * * * *